United States Patent [19]

Williams

[11] 3,820,030

[45] June 25, 1974

[54] PULSE SAMPLING AND SYNCHRONIZATION CIRCUIT

[75] Inventor: Robert C. Williams, Churchville, Pa.

[73] Assignee: GTE Information Systems Incorporated, Stamford, Conn.

[22] Filed: Sept. 5, 1973

[21] Appl. No.: 394,487

[52] U.S. Cl. .................... 328/63, 307/269, 328/72, 328/179

[51] Int. Cl. .......................... H03k 1/00, H03k 3/04

[58] Field of Search ......... 307/269; 328/63, 72, 179

[56] References Cited

UNITED STATES PATENTS

| | | | |
|---|---|---|---|
| 3,247,491 | 4/1966 | Du Vall | 307/269 |
| 3,544,907 | 12/1970 | Bleickardt | 307/269 |
| 3,566,280 | 2/1971 | Emmons et al. | 307/269 |
| 3,597,539 | 8/1971 | Clark | 307/269 |
| 3,619,662 | 11/1971 | Vachon | 307/269 |
| 3,705,315 | 12/1972 | Clark | 307/269 |

*Primary Examiner*—Stanley D. Miller, Jr.
*Attorney, Agent, or Firm*—Peter Xiarhos; Elmer J. Nealon; Norman J. O'Malley

[57] ABSTRACT

A pulse sampling and synchronization circuit for producing sampling pulses synchronized with serial input data. Serial input data is applied to a data input of a first flip-flop which is clocked to reproduce the input data at a first output thereof. The first output of the first flip-flop is coupled to a first input of an exclusive-OR gate and a second output thereof is coupled to a data input of a second flip-flop. An output of the second flip-flop is coupled to a second input of the exclusive-OR gate. When the two flip-flops are clocked, output pulses are produced by the exclusive-OR gate corresponding to the transitions in the data at the first output of the first flip-flop.

The pulse sampling and synchronization circuit also includes a feedback ring counter and an output gate coupled thereto. The feedback ring counter is operable to cycle repetitively through eight operating states in succession and the output gate operates to produce a sampling pulse during two states of the counter, for example, during states 5 and 6. When the counter is in state 1 when an output pulse is produced by the exclusive-OR gate, the sampling pulse produced by the output gate during the following states 5 and 6 is synchronized with the bit of data then present at the first output of the first flip-flop, specifically, it has a leading edge aligned with the center of the bit of data. When the counter is in any one of the other states when an output pulse is produced by the exclusive-OR gate, the sampling pulse produced by the output gate during states 5 and 6 of the counter is not synchronized with the bit of data then present at the first output of the first flip-flop. To achieve the desired synchronization in accordance with the present invention, when the counter is in any one of states 2, 3, and 4 when an output pulse is produced by the exclusive-OR gate, the counter is caused to repeat its existing state; when the counter is in any one of states 5, 6, 7, and 8 when an output pulse is produced by the exclusive-OR gate, the counter is caused to skip a state. The desired synchronization is achieved after one or more cycles of operation of the counter.

12 Claims, 4 Drawing Figures

PATENTED JUN 25 1974

3,820,030

SHEET 2 OF 3

SEQUENCE OF COUNTER 8

VALID LOOP

| STATE | $A_0$ | $B_0$ | $C_0$ | $D_0$ |
|---|---|---|---|---|
| 1 | 0 | 0 | 0 | 0 |
| 2 | 1 | 0 | 0 | 0 |
| 3 | 1 | 1 | 0 | 0 |
| 4 | 1 | 1 | 1 | 0 |
| 5 | 1 | 1 | 1 | 1 |
| 6 | 0 | 1 | 1 | 1 |
| 7 | 0 | 0 | 1 | 1 |
| 8 | 0 | 0 | 0 | 1 |

INVALID LOOP

| STATE | $A_0$ | $B_0$ | $C_0$ | $D_0$ |
|---|---|---|---|---|
| 9 | 0 | 0 | 1 | 0 |
| 10 | 1 | 0 | 0 | 1 |
| 11 | 0 | 1 | 0 | 0 |
| 12 | 1 | 0 | 1 | 0 |
| 13 | 1 | 1 | 0 | 1 |
| 14 | 0 | 1 | 1 | 0 |
| 15 | 1 | 0 | 1 | 0 |
| 16 | 0 | 1 | 0 | 1 |

PULSE SAMPLING AND SYNCHRONIZATION CIRCUIT

BACKGROUND OF THE INVENTION

The present invention relates to a pulse sampling and synchronization circuit and, more particularly, to a pulse sampling and synchronization circuit for producing sampling pulses for sampling serial input data in synchronism with the input data.

There are many data processing applications in which it is desired to sample serial input binary data at the mid-points of the bits comprising the data. Very often the sampling of serial binary data is accomplished by detecting the leading edges of the data and, after detecting each leading edge, causing a conventional binary counter to count through a particular sequence of counts. When a predetermined count of the counter corresponding to the expected mid-point of a bit is reached, this count is decoded by a suitable decoding gate to derive a sampling pulse for sampling the center of a corresponding bit. In other applications, a conventional binary counter may be used which cycles repetitively through a predetermined sequence of binary counts, one or more counts of which are decoded by suitable gates to derive sampling pulses for sampling the serial input binary data. The count of the counter is examined each time that a transition occurs in the serial input binary data and, if the count of the counter is other than a specified count, the mode of operation of the counter is adjusted so as to achieve the desired timing or synchronization relationship between the sampling pulse derived therefrom and a corresponding bit of the input data.

While the above pulse sampling arrangements are suitable for use in many data processing applications, these arrangements are highly susceptible to false operation due to spurious signals or noise. In addition, the nature of the binary counts produced by the binary counters in these arrangements requires that decoding gates having several inputs, for example, three or more inputs, be used for decoding the appropriate counts of the counter.

SUMMARY OF THE INVENTION

In accordance with the present invention, a pulse sampling and synchronization circuit is provided which avoids the disadvantages of prior art pulse sampling arrangements as briefly described hereinabove. The pulse sampling and synchronization circuit of the invention includes a transition detection means and first and second control means coupled to the transition detection means and each having an output. The transition detection means is employed to detect transitions of input binary data and operates to produce an output signal corresponding to each transition of the input binary data. Each of the first and second control means operates in the absence of an output signal produced by the transition detection means to produce a first output condition at the output thereof.

The pulse sampling and synchronization circuit further includes a source of clock pulses and a counter means coupled to the outputs of the abovementioned first and second control means and to the source of clock pulses. The counter means includes a plurality of flip-flops, a first circuit means, a second circuit means and a feedback circuit means. Each of the flip-flops has first and second inputs, a clock input and first and second outputs. Each of the flip-flops has a first operating state during which a first output condition is produceed at its first output and a second output condition is produced at its second output and a second operating state during which the opposite output conditions are produced at its first and second outputs. The first circuit means is coupled to the source of clock pulses, to the output of the first control means and to the clock inputs of the flip-flops. The second circuit means is coupled between selected outputs of the flip-flops and the first and second inputs of the flip-flops and to the output of the second control means. The feedback circuit means is also coupled between selected outputs of the flip-flops and the first and second inputs of the flip-flops and to the output of the second control means. The first and second circuit means are jointly operative when first output signals are produced concurrently at the outputs of the first and second control means in the absence of an output signal produced by the transition detection means and when clock pulses are produced by the source of clock pulses to establish a recurring sequence of different combinations of output conditions at predetermined outputs of the flip-flops. These different combinations of output conditions represent different operating states of the counter means.

The pulse sampling and synchronization circuit of the invention further includes first, second, third and fourth state-detecting means. The first state-detecting means is coupled to the counter means for detecting a first set of operating states of the counter means and operates when the output conditions at the predetermined outputs of the flip-flops represent the first set of operating states of the counter means to produce an output sampling signal to be used for sampling the input binary data. The second state-detecting means is coupled to the counter means for detecting a second set of operating states of the counter means and operates when the output conditions at the predetermined outputs of the flip-flops represent any one of the second set of operating states to produce an output signal. The first control means is further operative in response to an output signal being produced by the second state-detecting means while an output signal is produced by the transition detection means to produce a second output condition at the output thereof. The first circuit means of the counter means is operative in response to a second output condition being produced at the output of the first control means and when a clock pulse is produced by the source of clock pulses to cause the flip-flops to produce a combination of output conditions at the predetermined outputs thereof bearing a predetermined first relationship to the then existing combination of output conditions.

The third state-detecting means is coupled to the counter means for detecting a third set of operating states of the counter means and operates when the output conditions at the predetermined outputs of the flip-flops represent any one of the third set of operating states to produce an output signal. The second control means is further operative in response to an output signal being produced by the third state-detecting means while an output signal is produced by the transition detection means to produce a second output condition at the output thereof. The feedback circuit means of the counter means operates in response to a second output condition being produced at the output of the second control means and when a clock pulse is produced by the source of clock pulses to cause the flip-flops to produce a combination of output conditions at the predetermined outputs thereby bearing a predetermined second relationship to the then existing combination of output conditions.

The fourth state-detecting means is coupled to the counter means for detecting another state of the counter means and operates when the output conditions at the predetermined outputs of the flip-flops represent the another state of the counter means to produce an output signal. The first and second control means are operative in response to an output signal being produced by the fourth state-detecting means while an output signal is produced by the transition detection means to produce first output conditions at the outputs thereof, whereby when the first state-detecting means operates to produce an output sampling signal during the first set of operating states of the counter means the leading edge of the output sampling signal bears a predetermined time relationship with respect to a particular point of a bit of the input binary data.

BRIEF DESCRIPTION OF THE DRAWING

Various objects, features, and advantages of a pulse sampling and synchronization circuit in accordance with the present invention will be apparent from the following detailed discussion taken in conjunction with the accompanying drawing in which:

FIGS. 2(*b*)–2(*l*) illustrate waveforms occurring at different points in the pulse sampling and synchronization circuit;

DETAILED DESCRIPTION OF THE INVENTION

Figure 1:
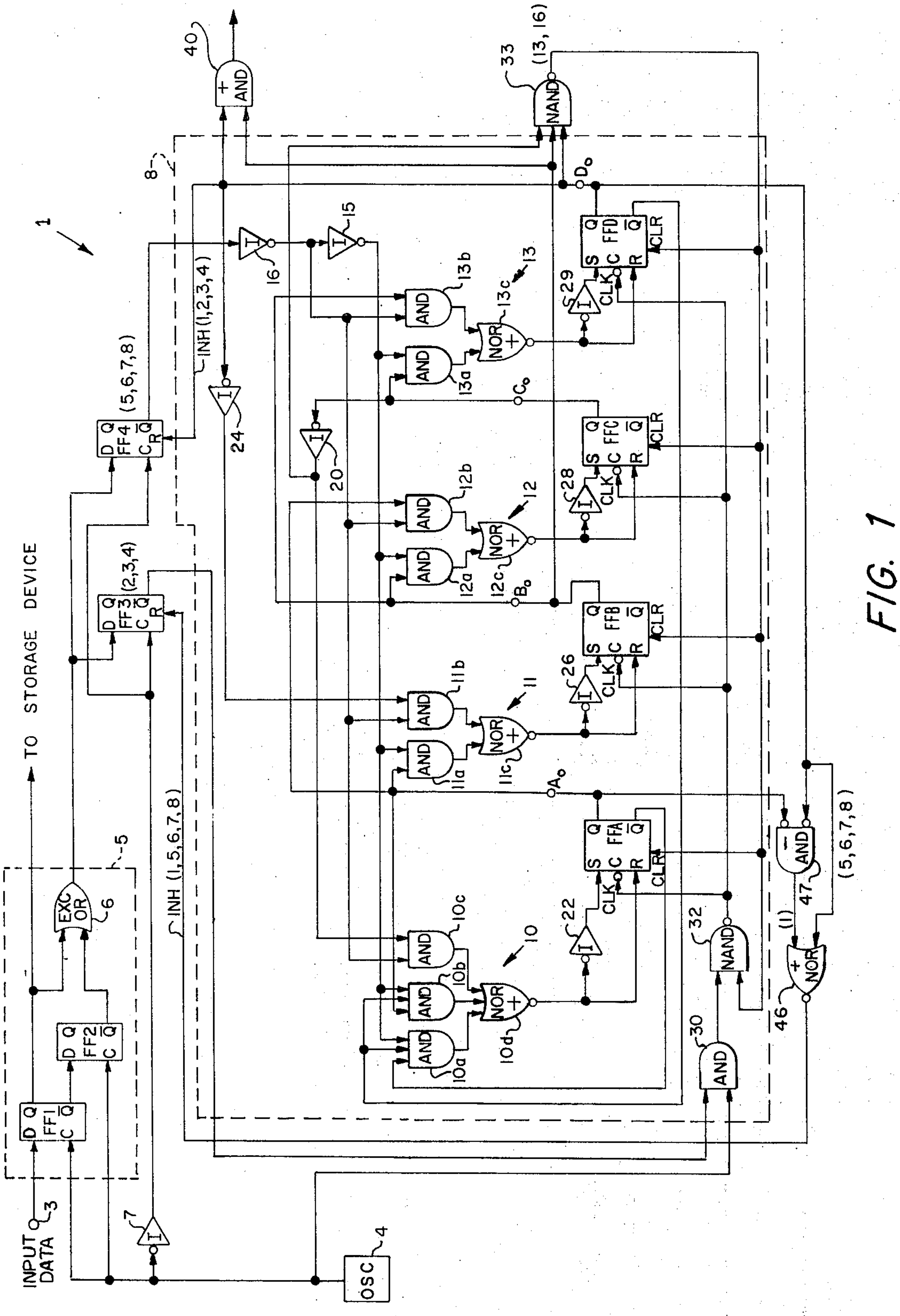
FIG. 1 is a schematic block diagram of a pulse sampling and synchronization circuit in accordance with the present invention.
Figures 2A, 2B, 2C, 2D, 2E, 2F, 2G, 2H, 2I, 2J, 2K, 2L:
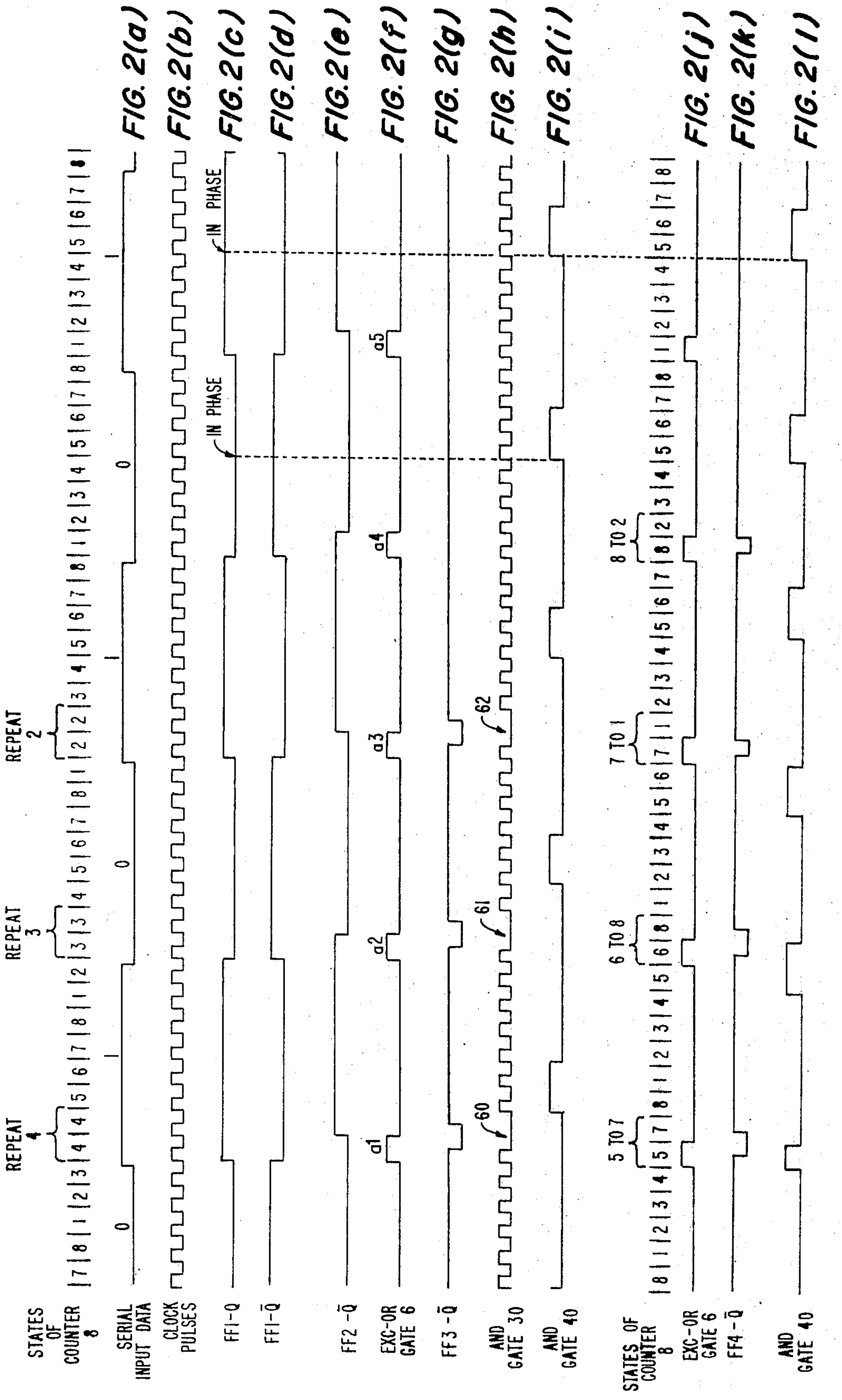
FIG. 2(*a*) is an exemplary waveform of input serial binary data to be sampled by the pulse sampling and synchronization circuit of the present invention.

Referring now to FIG. 1, there is shown a pulse sampling and synchronization circuit 1 in accordance with the present invention. The pulse sampling and synchronization circuit 1 includes an input terminal 3 to which input data to be sampled by the pulse sampling and synchronization circuit 1 is applied. An exemplary form of the input data is shown in FIG. 2(*a*) and includes a plurality of binary 1's and 0's arranged in succession. The positive-going and negative-going transitions of the input data, that is, the leading and trailing edges thereof, are detected by a double-edge detection circuit 5 which, as shown in FIG. 1, includes a pair of flip-flops FF1 and FF2 and an exclusive-OR gate 6. The flip-flop FF1 has a data input D connected to the input terminal 3, a clock input C, a first output Q, and a second output $\overline{Q}$. The first output Q of the flip-flop FF1 is connected to a first input of the exclusive-OR gate 6 and the second output $\overline{Q}$ is connected to a data input D of the flip-flop FF2. The flip-flop FF2 also has a clock input C, an output Q (not used), and an output $\overline{Q}$ connected to a second input of the exclusive-OR gate 6. Clock pulses for clocking the flip-flops FF1 and FF2 are derived from an oscillator 4 connected to the clock inputs C of the flip-flops FF1 and FF2. A typical form of the clock pulses produced by the oscillator 4 is shown in FIG. 2(*b*). As can be seen from FIG. 2(*b*), the clock pulses have a frequency which is a multiple, for example, 8 times, the frequency of the input data. When the flip-flop FF1 is clocked, the input data to be sampled by the pulse sampling and synchronization circuit 1 is reproduced at the output Q of the flip-flop FF1 and it is the data at this point that is actually sampled by sampling pulses produced by the pulse sampling and synchronization circuit 1. The sampled data is then applied to and stored in a suitable storage device (not shown).

The output of the exclusive-OR gate 6 is connected in common to data inputs D of a pair of control flip-flops FF3 and FF4. Each of the control flip-flops FF3 and FF4 also has a clock input C, an output Q (not used), an output $\overline{Q}$, and a reset input R. Clock pulses for clocking the control flip-flops FF3 and FF4 are derived from the oscillator 4 after being inverted by an inverter 7. The outputs $\overline{Q}$ of the control flip-flops FF3 and FF4 are coupled to a feedback ring counter 8 for controlling the operation of the counter 8, as will be described in detail hereinafter. Briefly, in the operation of the control flip-flops FF3 and FF4, each time that a positive-going or negative-going transition is detected in the input data by the double-edge detection circuit 5, an output pulse is produced by the double-edge detection circuit 5 and applied in common to the data inputs D of the control flip-flops FF3 and FF4. In response to this output pulse, either one or neither of the control flip-flops FF3 and FF4, depending on the state of the feedback ring counter 8 during the time that the output pulse is produced by the exclusive-OR gate 6, is toggled to cause its output $\overline{Q}$ to change from a first voltage level to a second voltage level. A change in the voltage level causes the operation of the feedback ring counter 8 to be altered, as will later be described in detail.

The abovementioned feedback ring counter 8 is basically a 16-state counter. As employed in the present invention, the feedback ring counter 8 includes four flip-flops FFA-FFD each of which includes a set input S, a reset input R, a clock input C, an output Q, an output $\overline{Q}$, and a clear (CLR) input. The signal levels at the output Q of the flip-flops FFA-FFD appear at corresponding output terminals $A_o$–$D_o$. The four flip-flops FFA to FFD are interconnected by a plurality of gate arrangements 10–13 by which the various states for the feedback ring counter 8 are established.

The gate arrangement 10 includes three AND gates 10*a*–10*c*, and a positive NOR gate 10d. The AND gate 10 has an input from the output $\overline{Q}$ of the flip-flop FFA, an input from the output $\overline{Q}$ of the flip-flop FFD, and an input from the output of an inverter 15 which, as shown in FIG. 1, is connected in series with another inverter 16 to the output $\overline{Q}$ of the control flip-flop FF4. The AND gate 10b has an input from the output Q of the flip-flop FFA, an input from the output $\overline{Q}$ of the flip-flop FFD, and an input from the output of the inverter 15. The AND gate 10*c* has an input from the output of the inverter 16 and a feedback input from the output Q of the flip-flop FFC after being inverted by an inverter 20. The outputs of the AND gates 10*a*, 10*b* and 10*c* are coupled to corresponding inputs of the positive NOR gate 10*d*, the output of which is coupled through an inverter 22 to the set input S of the flip-flop FFA and also directly to the reset input R of the flip-flop FFA.

The gate arrangement 11 includes a pair of AND gates 11*a* and 11*b* and a positive NOR gate 11*c*. The AND gate 11*a* has a first input from the output Q of the flip-flop FFA and a second input from the output of the inverter 15. The AND gate 11*b* has a first input from the output of the inverter 16 and a feedback input from the output Q of the flip-flop FFD after being inverted by an inverter 24. The outputs of the AND gates 11*a* and 11*b* are coupled to corresponding inputs of the positive NOR gate 11*c*, the output of which is coupled through an inverter 26 to the set input S of the flip-flop FFB and also directly to the reset input R of the flip-flop FFB.

The gate arrangement 12, like the gate arrangement 11, includes a pair of AND gates 12*a* and a positive NOR gate 12*c*. The AND gate 12*a* has a first input from the output Q of the flip-flop FFB and a second input from the output of the inverter 15. The AND gate 12*b* has a first input from the output of the inverter 16 and a direct feedback input from the output Q of the flip-flop FFA. The outputs of the AND gates 12*a* and 12*b* are coupled to corresponding inputs of the positive NOR gate 12*c*, the output of which is coupled through an inverter 28 to the set input S of the flip-flop FFC and also directly to the reset input R of the flip-flop FFC.

The gate arrangement 13 also includes a pair of AND gates 13*a* and 13*b* and a positive NOR gate 13*c*. The AND gate 13*a* has a first input from the output Q of the flip-flop FFC and a second input from the output of the inverter 15. The AND gate 13*b* has a first input from the output of the inverter 16 an a direct feedback input from the output Q of the flip-flop FFB. The outputs of the AND gates 13*a* and 13*b* are coupled to corresponding inputs of the positive NOR gate 13*c*, the output of which s coupled through an inverter 29 to the set input S of the flip-flop FFD and also directly to the reset input R of the flip-flop FFD.

Clocking of the feedback ring counter 8 is accomplished via an AND gate 30 coupled at its inputs to the oscillator 4 and to the output $\overline{Q}$ of the control flip-flop FF3 and also by a NAND gate 32. When the control flip-flop FF3 is not in its toggled state, the output $\overline{Q}$ thereof is high and permits clock pulses produced by the oscillator 4 to be coupled through the AND gate 30 to a first input of the NAND gate 32. Assuming that a second input of the NAND gate 32, from another NAND gate 33, is also high at this time, the clock pulses coupled through the AND gate 30 are also coupled through the NAND gate 32 to the clock inputs C of all of the flip-flops FFA-FFD. These clock pulses, together with the outputs of the gating arrangements 10–13, establish a counting mode of operation for the feedback ring counter 8.

The feedback ring counter 8, when arranged as shown in FIG. 1, is capable of having 16 different operating states whereby sixteen different combinations of voltage levels representing binary 1's and 0's may be produced at the output terminals $A_o$–$D_o$ associated with the several outputs Q of the flip-flops FFA-FFD. These 16 operating states are set forth in the table of FIG. 3. For the purposes of the present invention, however, it is desired to use only eight of these sixteen states, specifically, states 1–8, these states being designated in FIG. 3 as "valid loop" states. Moreover, it is desired that the feedback ring counter 8 repetitively cycle through only the eight operating states of this valid loop. It is possible, however, for the feedback ring counter 8 occasionally and undesirably to be in one of the operating states 9–16, for example, during start-up operations (power on) or as a result of a malfunctioning of the feedback ring counter 8. When this happens, the feedback ring counter 8 can cycle through the operating states 9–16, these latter states being designated in FIG. 3 as the "invalid loop" states.

In accordance with the present invention, whenever the feedback ring counter 8 operates in the invalid loop, it is caused to re-enter the valid loop and to thereafter cycle repetitively through the valid loop. The foregoing action is accomplished by the use of the NAND gate 33. The NAND gate 33 operates to detect one or more of the invalid states of the feedback ring counter 8, for example, the states 13 and 16, and in response thereto to force the counter 8 to a state of the valid loop, for example, to state 1 of the valid loop. Thereafter, and barring some new and unexpected reentry into the invalid loop, the feedback ring counter 8 repetitively cycles through the eight states of the valid loop. To detect the aforementioned invalid states 13 and 16 of the feedback ring counter 8, the NAND gate 33 has a first input from the output Q of the flip-flop FFB, a second input from the output of the inverter 20 (representing an inversion of the output Q of the flip-flop FFC), and a third input from the output Q of the flip-flop FFD. These three inputs have the binary values 111 and correspond to the combination of binary values 101 found at the output terminals $B_o$, $C_o$ and $D_o$ of the feedback ring counter 8 when the counter 8 is in states 13 and 16. The aforesaid combination 101 is found at the output terminals $B_o$, $C_o$ and $D_o$ only when the counter 8 is in states 13 and 16, as indicated by table of FIG. 3. The output of the NAND gate 33, which is low (binary 0 level) when the inputs thereof are all high (binary 1 level) is coupled in common to the clear (CLR) inputs of the flip-flops FFA-FFD and causes the flip-flops FFA-FFD to be cleared directly to their 0 states. Thus, the feedback ring counter 8 is caused to be forced to state 1 (see FIG. 3). Whenever the feedback ring counter 8 is not in the invalid loop, the output of the NAND gate 33 is high whereby the NAND gate 32 to which it is coupled is enabled to pass clock pulses therethrough for clocking the counter 8 in the normal manner.

Figures 3, 4:
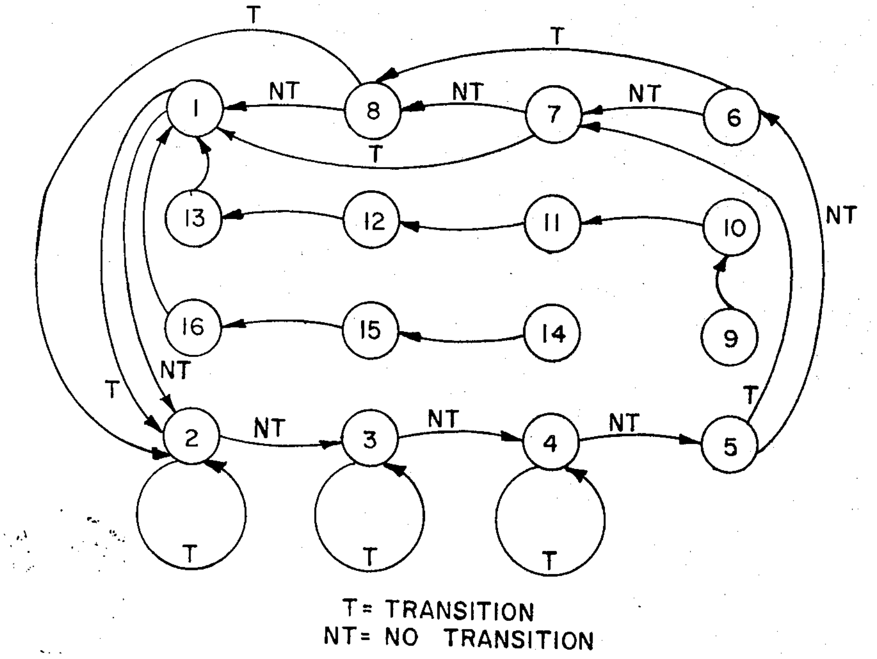
FIG. 3 is a table of operating states of a feedback ring counter employed in the pulse sampling and synchronization circuit.
FIG. 4 is a state diagram relating to the feedback ring counter.

The pulse sampling and synchronization circuit 1 of the invention further includes a positive two-input AND gate 40. The positive AND gate 40 operates to produce output sampling pulses during specific states of the feedback ring counter 8, specifically, during states 5 and 6. One sampling pulse is produced by the AND gate 40 for each cycle of eight states of the counter 8. The sampling pulses produced by the positive AND gate 40 are used for sampling the bits of data present at the output Q of the flip-flop FF1. To detect states 5 and 6 of the counter 8, the AND gate 40 has a first input from the output Q of the flip-flop FFB and a second input from the output Q of the flip-flop FFD. These inputs have the binary values 11, representing a combination of binary values found at the output terminals $B_o$ and $D_o$ of the feedback ring counter 8 only when the counter 8 is in states 5 and 6, as indicated by the table of FIG. 3. Desirably, the leading edge of each sampling pulse produced by the AND gate 40 should coincide with the mid-point of the bit of data then present at the output Q of the flip-flop FF1. This condition is achieved whenever the feedback ring counter 8 is in a particular state, specifically state 1, when an output pulse is produced by the exclusive-OR gate 6. In the event the feedback ring counter 8 is not in state 1 when an output pulse is produced by the exclusive-OR gate 6, the sampling pulse produced by the AND gate 40 during states 5 and 6 has a leading edge which does not coincide with the center of the bit then present at the output Q of the flip-flop FF1. In order to "synchronize" the sampling pulses produced by the AND gate 40 with the bits of data present at the output Q of the flip-flop FF1, the operation of the feedback ring counter 8 is adjusted, over one or more cycles, to cause the counter 8 to operate in state 1 when an output pulse is produced by the exclusive-OR gate 6. This result is achieved by examining the state of the counter 8 whenever an output pulse is produced by the exclusive-OR gate 6 and, depending on the state of the counter 8 at that time, adjusting or altering the state of the counter 8 so as to approach state 1. Specifically, and in accordance with the present invention, whenever the counter 8 is in state 2, 3, or 4 when an output pulse is produced by the exclusive-OR gate 6, the existing state of the counter 8 is caused to be repeated; whenever the counter 8 is in state 5, 6, 7, or 8 when an output pulse is produced by the exclusive-OR gate 6, the state of the counter 8 is caused to increase by two, that is, from states 5 to 7, 6 to 8, 7 to 1, or 8 to 2. The above mode of control of the states of the counter 8 has been found to be the most practical for causing the counter 8 to approach state 1.

The aforesaid states 2, 3, and 4 of the counter 8 are detected by the flip-flop FFD by virtue of its output Q (at the output terminal $D_o$) being low (binary 0 level) during these states, as indicated by the table of FIG. 3. Whenever the output Q of the flip-flop FFD is low, this low level is coupled to the reset input R of the control flip-flop FF4 and prevents, or inhibits, the control flip-flop FF4 from being toggled by an output pulse produced by the exclusive-OR gate 6. However, the control flip-flop FF3 is not inhibited during states 2, 3, and 4 of the counter 8 and may be toggled during these states by an output pulse produced by the exclusive-OR gate 6. When this happens, the output $\overline{Q}$ of the control flip-flop FF3 goes from high to low. The corresponding input to the AND gate 30 accordingly goes low with the result that a clock pulse from the oscillator 4 is prevented from passing through the AND gate 30. This loss of a clock pulse has the effect of causing the counter 8 to repeat its existing state.

The aforementioned states 5, 6, 7 and 8 of the counter 8 are also detected by the flip-flop FFD by virtue of its output $\overline{Q}$ (at the output terminal $D_o$) being high (binary 1 level) during these states, as indicated by the table of FIG. 3. Whenever the output Q of the flip-flop FFD is high, this high level is coupled to a first input of a positive two-input NOR gate 46. The positive NOR gate 46 operates in response to the high level at its first input to produce an output which is low (binary 0 level), this output then being coupled to the reset input R of the control flip-flop FF3. The low output of the positive NOR gate 46 prevents, or inhibits, the control flip-flop FF3 from being toggled by an output pulse produced by the exclusive-OR gate 6. However, the control flip-flop FF4 is not inhibited from being toggled during states 5, 6, 7 and 8 of the counter 8, and may be toggled during these states by an output pulse produced by the exclusive-OR gate 6. When this happens, the output Q of the control flip-flop FF4 goes from high to low. This low output is coupled into the counter 8 and causes the counter 8 to skip a state. The manner in which this latter operation is accomplished will be described more fully hereinafter.

It is to be noted that when the counter 8 is in state 1 ("in phase" state) when an output pulse is produced by the exclusive-OR gate 6, neither of the control flip-flops FF3 and FF4 is toggled. When the counter is in state 1, the outputs Q of the flip-flops FFA and FFD (at the output terminals $A_o$ and $D_o$, respectively) are both low, as indicated by the table of FIG. 3. The output Q of the flip-flop FFD is coupled directly to the reset input R of the control flip-flop FF4 and inhibits this flip-flop from being toggled by an output pulse produced by the exclusive-OR gate 6. To inhibit the control flip-flop FF3, the outputs Q of the flip-flops FFA and FFD are both coupled into corresponding inputs of a negative two-input AND gate 47. The negative AND gate 47 operates to produce an output which is high (binary 1 level) whenever the outputs Q of the flip-flops FFA and FFD are both low. It will be noted from the table of FIG. 3 that the outputs Q of the flip-flops FFA and FFD (at the output terminals $A_o$ and $D_o$) are both low simultaneously only during state 1 of the valid loop of the counter 8. The output of the AND gate 47 is applied to a second input of the positive NOR gate 46 which then operates to produce and apply a low output to the reset input R of the control flip-flop FF3. This low output serves to inhibit the control flip-flop FF3 from being toggled by an output pulse produced by the exclusive-OR gate 6.

In summary, therefore, when the counter 8 is in state 1 ("in phase" state), both of the control flip-flops FF3 and FF4 are inhibited from being toggled and the counter 8 is permitted to be clocked through its states in succession by clock pulses passing through the AND gate 30 and the NAND gate 32. When the counter 8 is in any one of states 2, 3, and 4, the control flip-flop FF4 is inhibited from being toggled and the control flip-flop FF3 is permitted to be toggled by an output pulse produced by the exclusive-OR gate 6 whereby the counter 8 is caused to repeat its existing state. When the counter 8 is in any one of states 5, 6, 7 and 8, the control flip-flop FF3 is inhibited from being toggled and the control flip-flop FF4 is permitted to be toggled by an output pulse produced by the exclusive-OR gate 6 whereby the counter 8 is caused to skip a state.

Before proceeding to a discussion of the various waveforms of FIGS. 2(*a*)–2(*l*) and their relationship to the pulse sampling and synchronization circuit 1 of FIG. 1, it may be helpful to discuss the manner in which the counter 8 operates in its various states as set forth in the table of FIG. 3. It will be assumed for purposes of this discussion that all of the flip-flops FFA-FFD are initially in their reset states whereby all of the outputs Q of the flip-flops FFA-FFD are low (binary 0 levels). This latter set of low levels (0000) represents state 1, as indicated in the table of FIG. 3. It will also be assumed that the control flip-flops FF3 and FF4 are not in their toggled states whereby, as mentioned previously, the outputs $\overline{Q}$ thereof are both high (binary 1 levels). With the outputs Q of the flip-flops FFA and FFD both low, the other outputs $\overline{Q}$ thereof are both high (binary 1 levels) and these high levels are applied to two of the three inputs of the AND gate 10*a* of the gating arrangement 10. With the output $\overline{Q}$ of the control flip-flop FF4 high, this high level is converted to a low level by the inverter 16 and back to a high level by the inverter 15 and then applied to the third input of the AND gate 10*a*. With all of its inputs high at the same time, the AND gate 10*a* produces an output which is high. This output is then applied to the positive NOR gate 10*d*. The positive NOR gate 10*d* operates in response to the output from the AND gate 10*a* to produce an output which is low. This output is then inverted by the inverter 22 to a high level and applied to the set input S of the flip-flop FFA. On the trailing edge of the next clock pulse appearing at the output of the NAND gate 32 (the output $\overline{Q}$ of the control flip-flop FF3 being high), the presence of the high level at the set input S of the flip-flop FFA causes the flip-flop FFA to be clocked to its opposite state whereby its output Q goes from low to high and its output $\overline{Q}$ goes from high to low, the latter condition disabling the AND gate 10*a*. The outputs at the output terminals $A_0$–$D_0$ at this time are therefore 1000, representing state 2 of the counter 8.

Following the aforesaid clocking of the flip-flop FFA-FFD, the high level at the output Q of the flip-flop FFA is applied to one of the three inputs of the AND gate 10*b* of the gating arrangement 10 and also to one of the two inputs of the AND gate 11*a* of the gating arrangement 11. The AND gate 10b also receives a high input from the output $\overline{Q}$ of the flip-flop FFD and a high input from the output of the inverter 15. Similarly, the AND gate 11*a* receives a high input from the output of the inverter 15. With the inputs to both of the AND gate 10*b* and 11*a* high at the same time, outputs are produced thereby which are both high. These outputs are applied to the corresponding positive NOR gates 10*d* and 11*c*. The positive NOR gates 10*d* and 11*c* operate in response to the inputs received thereby to produce outputs which are both low, these outputs then being inverted by the respective inverters 22 and 26 to high levels and applied to the set inputs S of the respective flip-flops FFA and FFB. On the trailing edge of the next clock pulse appearing at the output of the NAND gate 32, the presence of the high level at the set input S of the flip-flop FFA causes the flip-flop FFA to remain in its existing state whereby its output Q remains high and its output $\overline{Q}$ remains low. However, on the trailing edge of the aforementioned clock pulse, the presence of the high level at the set input S of the flip-flop FFB causes the flip-flop FFB to be clocked to its opposite state whereby its output Q goes from low to high. The outputs at the output terminals $A_0$–$D_0$ at this time are therefore 1100, representing state 3 of the counter 8.

The high level at the output Q of the flip-flop FFA is again applied to the aforementioned input of the AND gate 10*b* and also to the aforementioned input of the AND gate 11*a*. The high level at the output Q of the flip-flop FFB is applied at this time to one of the inputs of the AND gate 12*a* of the gating arrangement 12. Since the other inputs of the AND gates 10*b*, 11*a* and 12*a* are also high at this time, by virtue of the output $\overline{Q}$ of the flip-flop FFA and the output of the inverter 15 both being high, outputs which are high are produced by the AND gates 10*b*, 11*a* and 12*a* and applied to the corresponding positive NOR gates 10*d*, 11*c* and 12*c*. The positive NOR gates 10*d*, 11*c* and 12*c* operate in response to the inputs received thereby to produce outputs which are low, these outputs then being inverted by the respective inverters 22, 26 and 28 to high levels and applied to the set inputs S of the respective flip-flops FFA, FFB and FFC. On the trailing edge of the next clock pulse appearing at the output of the NAND gate 32, the presence of the high levels at the set inputs S of the flip-flops FFA and FFB cause the flip-flops FFA and FFB to remain in their existing states whereby their outputs Q remain high. However, on the trailing edge of this clock pulse, the presence of the high level at the set input S of the flip-flop FFC causes the flip-flop FFC to be clocked to its opposite state whereby its output $\overline{Q}$ goes from low to high. The outputs at the output terminals $A_0$–$D_0$ at this time are therefore 1110, representing state 4 of the counter 8.

The high level at the output Q of the flip-flop FFA is once again applied to the aforementioned inputs of the AND gates 10*b* and 11*a*, and the high level at the output $\overline{Q}$ of the flip-flop FFB is again applied to the aforementioned input of the AND gate 12*a*. The high level at the output of the flip-flop FFC is applied at this time to one of the inputs of the AND gate 13*a* of the gating arrangement 13. Since the other inputs of the AND gates 10*b*, 11*a*, 12*a* and 13*a* are also high at this time, again by virtue of the output $\overline{Q}$ of the flip-flop FFA and the output of the inverter 15 both being high, outputs which are high are produced by the AND gates 10*b*, 11*a*, 12*a* and 13*a* and applied to the corresponding positive NOR gates 10*d*, 11*c*, 12*c* and 13*c*, respectively. The positive NOR gates 10*d*, 11*c*, 12*c* and 13*c* operate in response to the inputs received thereby to produce outputs which are low, these outputs then being inverted by the respective inverters 22, 26, 28 and 29 to high levels and applied to the set inputs S of the respective flip-flops FFA, FFB, FFC and FFD. In the manner described previously, on the trailing edge of the next clock pulse appearing at the output of the NAND gate 32, the flip-flops FFA, FFB and FFC are caused to remain in their existing states and the flip-flop FFD is caused to be clocked to its opposite state. The output $\overline{Q}$ of the flip-flop FFD accordingly goes from low to high and the output Q goes from high to low. The outputs at the output terminals $A_0$–$D_0$ at this time are therefore 1111, representing state 5 of the counter 8.

Although specific details will not be presented herein, it will be noted that when the output $\overline{Q}$ of the flip-flop FFD goes low during state 5 of the counter 8, as indicated above, the AND gate 10*b* of the gating arrangement 10 is disabled and a high output is produced by the corresponding positive NOR gate 10d and applied to the reset input R of the flip-flop FFA. On the next clock pulse appearing at the output of the NAND gate 32, the presence of the low level at the reset input R of the flip-flop FFA causes the flip-flop FFA to be clocked back to its original state whereby its output Q goes from high to low and its output $\overline{Q}$ goes from low to high. The states of the other flip-flops FFB-FFD remain the same. The outputs at the output terminals $A_0$–$D_0$ at this time are therefore 0111, representing state 6 of the counter 8. The remaining states of the counter 8 may be derived in the same manner as described hereinabove. For this reason, the specific manner in which the receiving states are derived will not be described in detail herein.

The operation of the pulse sampling and synchronization circuit 1 will now be described in connection with the waveforms of FIGS. 2(*a*)—2(*l*). Input data, such as shown in FIG. 2(*a*), is applied to the input terminal 3 and, thus, to the data input D of the flip-flop FF1. Clock pulses, such as shown in FIG. 2(*b*), are applied to the clock inputs C of the flip-flop FF1. On the leading edge of each clock pulse following a positive-going transition (leading edge) of the input data, the output Q of the flip-flop FF1 goes from low to high, FIG. 2(*c*), and the output $\overline{Q}$ goes from high to low, FIG. 2(*d*). In a similar fashion, on the leading edge of each clock pulse following a negative-going transition (trailing edge) of the input data, the output Q of the flip-flop FF1 goes from high to low, FIG. 2(*c*), and the output $\overline{Q}$ goes from low to high, FIG. 2(*d*). The above operation of the flip-flop FF1 causes the data present at the input terminals to be reproduced at the output Q of the flip-flop FF1, however with a slight time displacement (by a fraction of a period of the clock pulse train).

The data at the output Q of the flip-flop FF1 is applied to one input of the exclusive-OR gate 6 and the data at the output $\overline{Q}$ of the flip-flop FF1 is applied to the data input D of the flip-flop FF2. Clock pulses are also applied to the clock input C of the flip-flop FF2. On the leading edge of each clock pulse following a negative-going transition (trailing edge) of the data at the output $\overline{Q}$ of the flip-flop FF1, the output $\overline{Q}$ of the flip-flop FF2 goes from low to high and, on the leading edge of each clock pulse following a positve-going transition (leading edge) of the data at the output Q of the flip-flop FF1, the output Q of the flip-flop FF2 goes from high to low, FIG. 2(*e*). The data at the output $\overline{Q}$ of the flip-flop FF2 is applied to a second input of the exclusive-OR gate 6. The exclusive-OR gate 6 operates to produce an output pulse, such as shown at *a*1–*a*5 in FIG. 2(*f*), only when one of its inputs is high and the other input is low. The output pulses produced by the exclusive-OR gate 6, each of which has a duration equal to the period of the clock pulse train produced by the oscillator 4, correspond to transitions in the input data at the input terminal 3 (or the data at the output Q of the flip-flop FF1) and are applied in common to the data inputs D of the control flip-flops FF3 and FF4. Clock pulses produced by the oscillator 4, after being inverted by the inverter 7, are also applied in common to the clock inputs C of the control flip-flops FF3 and FF4. Depending on the state of the counter 8 at the time that an output pulse is produced by the exclusive-OR gate 6, either one or neither of the control flip-flops FF3 and FF4 is caused to be toggled. The inversion of the clock pulses by the inverter 7 enables the toggling of the control flip-flops FF3 and FF4 to commence at the mid-points of the output pulses produced by the exclusive-OR gate 6.

As mentioned previously, whenever the counter 8 is in state 1 when an output pulse is produced by the exclusive-OR gate 6, a sampling pulse is produced by the positive AND gate 40 during the following states 5 and 6 which has a leading edge coinciding with the center of the bit of the data then present at the output Q of the flip-flop FF1. However, whenever the counter 8 is in one of the other states 2–8 when an output pulse is produced by the exclusive-OR gate 6, a sampling pulse is produced by the positive AND gate 40 during the following states 5 and 6 which does not have a leading edge coinciding with the center of the bit of the data then present at the ouput Q of the flip-flop FF1. As discussed previously, and as may be noted from FIGS. 2(*f*) and 2(*g*) and the counter state diagram above FIG. 2(*a*), when the counter 8 is in state 2, 3, or 4 when an output pulse is produced by the exclusive-OR gate 6, the control flip-flop FF4 is prevented from being toggled by the low output Q of the flip-flop FFD, and the control flip-flop FF3 is permitted to be toggled by the output pulse produced by the exclusive-OR gate 6. The output $\overline{Q}$ of the control flip-flop FF3 accordingly goes from high to low as it is toggled and prevents a clock pulse produced by the oscillator 4 from passing through the AND gate 30. The loss of a clock pulse as a result of the counter 8 being in state 2, 3, or 4 when an output pulse is produced by the exclusive-OR gate 6 is indicated at each of points 60–62 in FIG. 2(*h*). The loss of a clock pulse in effect causes the counter 8 to repeat its existing state. It will be noted from the drawing, particularly FIGS. 2(*a*) and 2(*i*), that when the counter 8 is in state 4 when an output pulse is produced by the exclusive-OR gate 6 (pulse *a*1), three cycles of operation of the counter 8 are required before the counter 8 is in state 1 coincident with an output pulse being produced by the exclusive-OR gate 6 (pulse *a*4). Similarly, when the counter 8 is in state 3 when an output pulse is produced by the exclusive-OR gate 6 (pulse *a*2), two cycles of operation of the counter 8 are required before the counter 8 is in state 1 coincident with an output pulse being produced by the exclusive-OR gate 6 (pulse *a*4), etc.

When the counter 8 is in any one of states 5, 6, 7 and 8 when an output pulse is produced by the exclusive-OR gate 6, noting the counter state diagram above FIG. 2(*j*) and also FIG. 2(*j*), the control flip-flop FF3 is inhibited via the output of the positive NOR gate 46 and the control flip-flop FF4 is permitted to be toggled by the output pulse. As mentioned previously, when the control flip-flop FF4 is toggled, its output $\overline{Q}$ goes from high to low, FIG. 2(*k*). This low output is coupled into the counter 8 and causes the counter 8 to skip a state, as will now be described in detail.

Assuming that the counter is in state 5 (1111) when an output pulse is produced by the exclusive-OR gate 6, the low output $\overline{Q}$ of the control flip-flop FF4 is converted to a high level by the inverter 16 and applied to a first input of each of the AND gates 10*c*, 11*b*, 12*b* and 13*b*. The AND gates 10*c* and 11b also receive second inputs which are both low as a result of the high outputs Q of the flip-flops FFC and FFD being inverted by the inverters 20 and 24, respectively. The AND gates 12*b* and 13*b* also receive second inputs which are both high from the outputs Q of the flip-flops FFA and FFB, respectively. The AND gates 10*c* and 11*b* accordingly produce outputs which are both low and the AND gates 12*b* and 13*b* accordingly produce outputs which are both high. The NOR gates 10*d* and 11*c* therefore produce outputs which are both high and the positive NOR gates 12*c* and 13*c* produce outputs which are both low. The high outputs of the NOR gates 10*d* and 11*c* are applied to the reset inputs R of the flip-flops FFA and FFB, respectively, and the low outputs of the NOR gates 12*d* and 13*c* are inverted to high levels by the respective inverters 28 and 29 and applied to the set inputs S of the respective flip-flops FFC and FFD. On the trailing edge of the next clock pulse at the output of the NAND gate 32, the presence of the high levels at the reset inputs R of the flip-flops FFA and FFB cause these flip-flops to switch to their opposite states where their outputs Q go from high to low. The presence of the high levels at the set inputs S of the flip-flops FFC and FFD cause these flip-flops to remain in their existing states whereby the outputs Q thereof remain high. The outputs at the output terminals $A_o$–$D_o$ at this time are therefore 0011, representing state 7 of the counter 8. Thus, when the counter 8 is in state 5 when an output pulse is produced by the exclusive-OR gate 6, the counter 8 is caused to shift from state 5 to state 7, skipping state 6.

By similar analysis, it can be shown that when the counter 8 is in state 6 (0111) when an output pulse is produced by the exclusive-OR gate 6, the NOR gates 10*d*, 11*c* and 12*c* produce outputs which are high and the NOR gate 13*c* produces an output which is low. As a result, the states of the flip-flops FFB and FFC are caused to be reversed and the states of the flip-flops FFA and FFD are caused to remain the same. Therefore, the outputs at the output terminals $A_o$–$D_o$ become 0001, representing state 8 of the counter 8. Similarly, when the counter 8 is in state 7 (0011) when an output pulse is produced by the exclusive-OR gate 6, the NOR gates 10*d*, 11*c*, 12*c* and 13*c* produce outputs which are high. As a result, the states of the flip-flops FFC and FFD are caused to be reversed and the states of the flip-flops FFA and FFB are caused to remain the same. Therefore, the outputs at the output terminals $A_o$–$D_o$ become 0000, representing state 1 of the counter 8. Finally, when the counter 8 is in state 8 (0001) when an output pulse is produced by the exclusive-OR gate 6, the NOR gates 11*c*, 12*c* and 13*c* produce outputs which are high and the NOR gate 10*d* produces an output which is low. As a result, the states of the flip-flops FFA and FFD are caused to be reversed and the states of the flip-flops FFB and FFC are caused to remain the same. Therefore, the outputs at the output terminals $A_o$–$D_o$ become 1000, representing state 2 of the counter 8. It will be noted from the drawing, particularly FIGS. 2(*c*) and 2(*l*), that when the counter 8 is in state 5 when an output pulse is produced by the exclusive-OR gate 6, three cycles of operation of the counter 8 are required before the counter is in state 1 coincident with an output pulse being produced by the exclusive-OR gate 6. Each cycle therefore moves the state of the counter 8 one step closer to the desired state. Similarly, when the counter 8 is in state 6 when an output pulse is produced by the exclusive-OR gate 6, two cycles of operation of the counter 8 are required before the counter 8 is in state 1 coincident with an output pulse being produced by the exclusive-OR gate 6, etc. It will also be noted from the drawing, particularly FIG. 2(*k*), that when the counter 8 is caused to change from state 7 to state 1 or from state 8 to state 2, the output Q of the flip-flop FFD changes from high to low and causes the output $\bar{Q}$ of the control flip-flop FF4 to go from low to high again on the trailing edge of the corresponding output pulse produced by the exclusive-OR gate 6 rather than one clock pulse later, as occurs in the cases of changing the states of the counter 8 from 5 to 7 and 6 to 8.

FIG. 4 illustrates a state diagram which summarizes the manner in which the operation of the counter 8 is controlled. The counter 8, in the absence of an output pulse from the exclusive-OR gate 6, thereby indicating the absence of a transition in the input data, repetitively cycles through its valid loop states 1–8 on successive clock pulses. When the counter 8 is in state 1 when an output pulse is produced by the exclusive-OR gate 6, thereby indicating the presence of a transition in the input data, the counter 8 simply advances to state 2 and, in the absence of transitions, to states 3–8. When the counter 8 is in any one of states 2, 3 and 4 when an output pulse is produced by the exclusive-OR gate 6, the counter 8 is caused to repeat its existing state. When the counter 8 is in any one of states 5, 6, 7 and 8 when an output pulse is produced by the exclusive-OR gate 6, the counter 8 is caused to skip a state. When the counter 8 is in any one of the invalid loop states 9–16, the state of the counter 8 reaches state 13 or 16 at some time during the cycle of the invalid loop whereupon the counter 8 is caused to be reset to state 1 of the valid loop.

The pulse sampling and synchronization circuit 1 has been described hereinabove to the extent that it is used to produce sampling pulses (at the output of the positive AND gate 40). If desired, additional pulse trains may be derived from the pulse sampling and synchronization circuit 1. For example, in addition to the gate 40 which produces output pulses during states 5 and 6 of the counter 8, other gates may be coupled to different points of the counter 8 for producing output pulses during the pairs of states 1 and 2, 3 and 4, and 7 and 8 of the counter 8. The trains of output pulses produced by these gates and the AND gate 40 will then be phase displaced from each other by 90°. In addition, various timing or strobe signals may be derived directly from the outputs Q of the flip-flops FFA-FFD (at the output terminals $A_o$–$D_o$) and used for any desired purpose. Other changes and modifications will be obvious to those skilled in the art without departing from the invention as called for in the appended claims.

What is claimed is:

1. A pulse sampling and synchronization circuit for sampling input binary data, comprising:

transition detection means for detecting transitions of the input binary data and operative to produce an output signal corresponding to each transition of the input binary data;

first and second control means coupled to the transition detection means and each having an output, each of said first and second control means being operative in the absence of an output signal produced by the transition detection means to produce a first output condition at the output thereof;

a source of clock pulses;

counter means coupled to the outputs of the first and second control means and to the source of clock pulses and comprising:

a plurality of flip-flops each having first and second inputs, a clock input, and first and second outputs, each of said flip-flops having a first operating state during which a first output condition is produced at its first output and a second output condition is produced at its second output and a second operating state during which the opposite output conditions are produced at its first and second outputs;

first circuit means coupled to the source of clock pulses, to the output of the first control means, and to the clock inputs of the flip-flops;

second circuit means coupled between selected outputs of the flip-flops and the first and second inputs of the flip-flops and to the output of the second control means;

said first and second circuit means being jointly operative when first output conditions are produced concurrently at the outputs of the first and second control means in the absence of an output signal produced by the transition detection means to establish a recurring sequence of different combinations of output conditions at predetermined outputs of the flip-flops, said different combinations of output conditions representing different operating states of the counter means; and feedback circuit means coupled between selected outputs of the flip-flops and the first and second inputs of the flip-flops and to the output of the second control means;

first state-detecting means coupled to the counter means for detecting a first set of operating states of the counter means, said first state-detecting means being operative when the output conditions at the predetermined outputs of the flip-flops represent the first set of operating states of the counter means to produce and output sampling signal to be used for sampling the input binary data;

second state-detecting means coupled to the counter means for detecting a second set of operating states of the counter means, said second state-detecting means being operative when the output conditions at the predetermined outputs of the flip-flops represent any one of the second set of operating states to produce an output signal;

said first control means being further operative in response to an output signal being produced by the second state-detecting means while an output signal is produced by the transition detection means to produce a second output condition at the output thereof;

said first circuit means of the counter means being further operative in response to a second output condition being produced at the output of the first control means and when a clock pulse is produced by the source of clock pulses to cause the flip-flops to produce a combination of output conditions at the predetermined outputs thereof bearing a predetermined first relationship to the then existing combination of output conditions;

third state-detecting means coupled to the counter means for detecting a third set of operating states of the counter means, said third state-detecting means being operative when the output conditions at the predetermined outputs of the flip-flops represent any one of the third set of operating states to produce an output signal;

said second control means being further operative in response to an output signal being produced by the thrid state-detecting means while an output signal is produced by the transition detection means to produce a second output condition at the output thereof;

said feedback circuit means of the counter means being operative in response to a second output condition being produced at the output of the second control means and when a clock pulse is produced by the source of clock pulses to cause the flip-flops to produce a combination of output conditions at the predetermined outputs thereof bearing a predetermined second relationship to the then existing combination of output conditions;

fourth state-detecting means coupled to the counter means for detecting another state of the counter means, said fourth state-detecting means being operative when the output conditions at the predetermined outputs of the flip-flops represent said another state of the counter means to produce an output signal;

said first and second control means being operative in response to an output signal being produced by the fourth state-detecting means while an output signal is produced by the transition detection means to produce first output conditions at the outputs thereof, whereby when said first state-detecting means operates to produce an output sampling signal during the first set of operating states of the counter means the leading edge of the output sampling signal bears a predetermined time relationship with respect to a particular point of a bit of the input binary data.

2. A pulse sampling and synchronization circuit in accordance with claim 1 wherein the transition detection means comprises:

a first flip-flop having an input for receiving input binary data, a clock input coupled to the source of clock pulses, and first and second outputs;

a second flip-flop having an input coupled to one of the outputs of the first flip-flop, a clock input coupled to the source of clock pulses, and first and second outputs; and an exclusive-OR gate having a first input coupled to an output of the first flip-flop, a second input coupled to an output of the second flip-flop, and an output.

3. A pulse sampling and synchronization circuit in accordance with claim 1 wherein:

the first control means includes a flip-flop and the second control means includes a flip-flop.

4. A pulse sampling and synchronization circuit in accordance with claim 1 wherein:

the first circuit means of the counter means is operative in response to a second output condition produced at the output of the first control means and when a clock pulse is produced by the source of clock pulses to cause the flip-flops to repeat the then existing combination of output conditions at the predetermined outputs thereof whereby the operating state of the counter means is caused to be repeated; and the feedback circuit means of the counter means is operative in response to a second output condition at the output of the second control means and when a clock pulse is produced by the source of clock pulses to cause the flip-flops to produce a new combination of output conditions at the predetermined output thereof representing a state of the counter means increased by two in the sequence from the preceding operating state.

5. A pulse sampling and synchronization circuit in accordance with claim 4 wherein:

the plurality of flip-flops includes flip-flops capable of providing at least eight operating states for the counter means;

the first set of operating states of the counter means detected by the first state-detecting means includes states five and six;

the second set of operating states of the counting means detected by the second state-detecting means includes states two, three and four;

the third set of operating states of the counter means detected by the third state-detecting means includes states five, six, seven and eight; and the said another operating state of the counter means detected by the fourth state-detecting means is state one.

6. A pulse sampling and synchronization circuit in accordance wth claim 5 wherein:

the flip-flops of the counter means are capable of providing 16 operating states;

said pulse sampling and synchronization circuit further comprising:

means coupled to the counter means for detecting at least one of the operating states nine through 16 of the counter means, said means being operative when the output conditions at the predetermined outputs of the flip-flops represent the said at least one of the operating states nine through 16 of the counter means to cause the flip-flops to produce output conditions at the predetermined outputs thereof representing one of the states one to eight of the counter means.

7. A pulse sampling and synchronization circuit in accordance with claim 1 wherein:

the first and second inputs of the flip-flops are set and reset inputs, respectively;

the first circuit means of the counter means includes gating means having a first input coupled to the source of clock pulses, a second input coupled to the output of the first control means, and an output coupled to the clock inputs of the flip-flops;

the second circuit means of the counter means comprises:

gating means coupled between the second output of the last one of the plurality of flip-flops and the set and reset inputs of the first one of the plurality of flip-flops;

gating means coupled between the first output of each of the plurality of flip-flops, with the exception of the last one of the flip-flops, and the set and reset inputs of the next flip-flop; and inverter circuit means coupled to the aforesaid gating means of the second circuit means and to the output of the second control means; and the feedback circuit means of the counter means comprises:

gating means coupled between the output of each of the plurality of flip-flops and the set and reset inputs of a different one of the flip-flops; and inverter circuit means coupled to the aforesaid gating means of the feedback circuit means and to the output of the second control means.

8. A pulse sampling and synchronization circuit in accordance with claim 7 wherein the transition detection means comprises:

a first flip-flop having an input for receiving the input binary data, a clock input coupled to the source of clock pulses, and first and second outputs;

a second flip-flop having an input coupled to one of the outputs of the first flip-flop, a clock input coupled to the source of clock pulses, and first and second outputs; and an exclusive-OR gate having a first input coupled to an output of the first flip-flop, a second input coupled to an output of the second flip-flop, and an output.

9. A pulse sampling and synchronization circuit in accordance with claim 8 wherein:

the first control means includes a flip-flop having an output and the second control means includes a flip-flop having an output.

10. A pulse sampling and synchronization circuit in accordance with claim 9 wherein:

the first circuit means of the counter means is operative in response to a second output condition produced at the output of the first control flip-flop and when a clock pulse is produced by the source of clock pulses to cause the flip-flops of the counter means to repeat the then existing combination of output conditions at the predetermined outputs thereof whereby the operating state of the counter means is caused to be repeated; and the feedback circuit means of the counter means is operative in response to a second output condition at the output of the second control flip-flop and when a clock pulse is produced by the source of clock pulses to cause the flip-flops of the counter means to produce a new combination of output conditions at the predetermined output thereof representing a state of the counter means increased by two in the sequence from the preceding operating state.

11. A pulse sampling and synchronization circuit in accordance with claim 10 wherein:

the plurality of flip-flops of the counter means includes flip-flops capable of providing at least eight operating states for the counter means;

the first set of operating states of the counter means detected by the first state-detecting means includes states five and six;

the second set of operating states of the counting means detected by the second state-detecting means includes states two, three and four;

the third set of operating states of the counter means detected by the third state-detecting means includes states five, six, seven and eight; and the said another operating state of the counter means detected by the fourth state-detecting means is state one.

12. A pulse sampling and synchronization circuit in accordance with claim 11 wherein:

the flip-flops of the counter means are capable of providing 16 operating states;

said pulse sampling and synchronization circuit further comprising:

means coupled to the counter means for detecting at least one of the operating states nine through 16 of the counter means, said means being operative when the output conditions at the predetermined outputs of the flip-flops of the counter means represent the said at least one of the operating states nine through 16 of the counter means to cause the flip-flops of the counter means to produce output conditions at the predetermined outputs thereof representing one of the states one to eight counter means.

* * * * *